Figure 2:
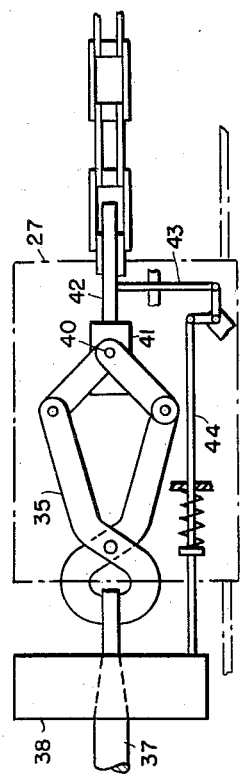

Sept. 23, 1958 G. E. KING 2,853,669
ADJUSTABLE VOLTAGE DRAW BENCH CONTROL SYSTEM
Filed May 14, 1954 2 Sheets-Sheet 1

United States Patent Office 2,853,669
Patented Sept. 23, 1958

2,853,669

ADJUSTABLE VOLTAGE DRAW BENCH CONTROL SYSTEM

George E. King, Eggertsville, N. Y., assignor to Westinghouse Electric Corporation, East Pittsburgh, Pa., a corporation of Pennsylvania Application May 14, 1954, Serial No. 429,862

9 Claims. (Cl. 318—282)

My invention relates generally to motor control systems and has reference in particular to such a control system for the motors of a draw bench.

To better understand the novel features of the present invention, a few brief statements on the sequence of operation of the draw bench apparatus to which the present invention has been applied may be helpful.

The sequence of the mechanical operations or steps to be performed by the subject draw bench apparatus for one cycle of operation is as follows:

Step 1.—Start draw motor and draw chain running at draw speed.

Step 2.—Press return button which slows chain down to hook on speed and carriage starts moving toward die block at maximum speed.

Step 3.—Carriage operates the slow limit switch as it nears the die block which slows down the carriage to slow speed.

Step 4.—Carriage operates final limit switch immediately before it contacts the die block which stalls the carriage at the die block, the ice tong device grips end of tube to be drawn, the hook on rear end of carriage engages draw chain and chain drags the carriage away from die block pulling tube through die block at slow or hook on speed.

Step 5.—As carriage moves away from die block, the final limit switch is reset and carriage motor is disconnected from the power supply and chain motor accelerates to run chain at draw speed as set by rheostats.

Step 6.—As carriage is dragged back to original starting position, the slow limit switch is reset.

Step 7.—At the end of draw or original starting position of carriage, the tube is pulled clear of the die block and the hook on rear of carriage is disengaged from chain and carriage stops.

Generally stated, it is an object of my invention to provide a new and novel adjustable voltage draw bench motor control system.

More specifically, it is an object of my invention to provide in an adjustable voltage draw bench control system for using one relay to perform a plurality of functions.

It is an object of my invention to provide in a draw bench motor control system for using a single relay to regulate the current of a carriage motor both when motoring and regenerating.

Yet another object of my invention is to provide in a variable voltage draw bench motor control system, for using a current responsive relay with a separately energized winding for reducing the voltage applied to a carriage motor for effecting reduced speed operation of the motor under one condition of operation and limiting the armature current of the motor under another condition of operation.

Other objects will in part be obvious, and will in part be explained hereinafter.

In accordance with the teachings of my invention, control of a carriage motor in a variable voltage draw bench motor control system is effected by using a carriage field relay having a shunt winding which is energized by a slow-down limit switch as the carriage approaches the die to insert a resistor into the field circuit of the generator supplying electrical energy to the carriage motor. A current winding on the carriage field relay is energized in accordance with the armature current of the carriage motor, and operates the relay as a regulator to regulate for a predetermined value of armature current, both when the carriage is running at rated speed and when the carriage motor regenerates, as when it is slowed down during its approach to the die.

Figure 1A:
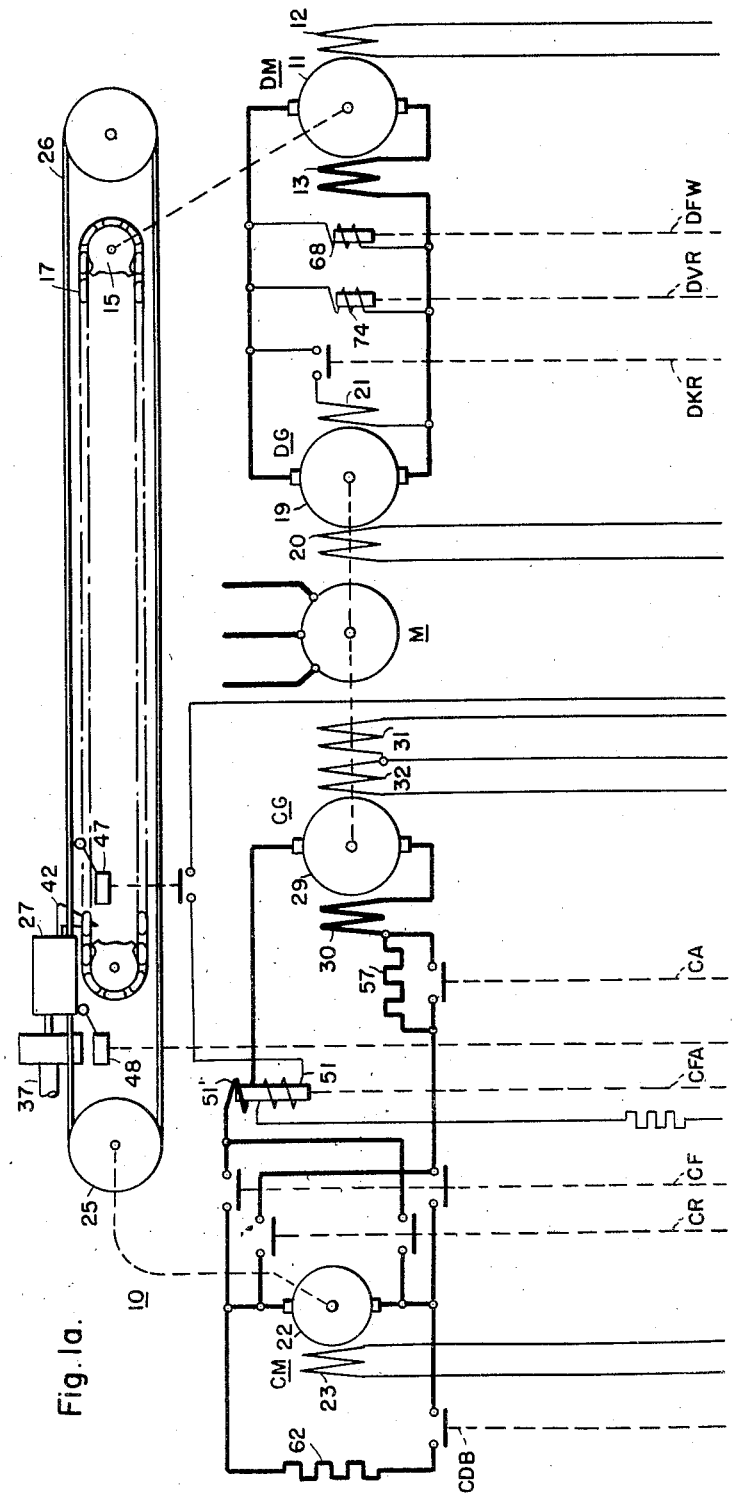
Figure 1B:
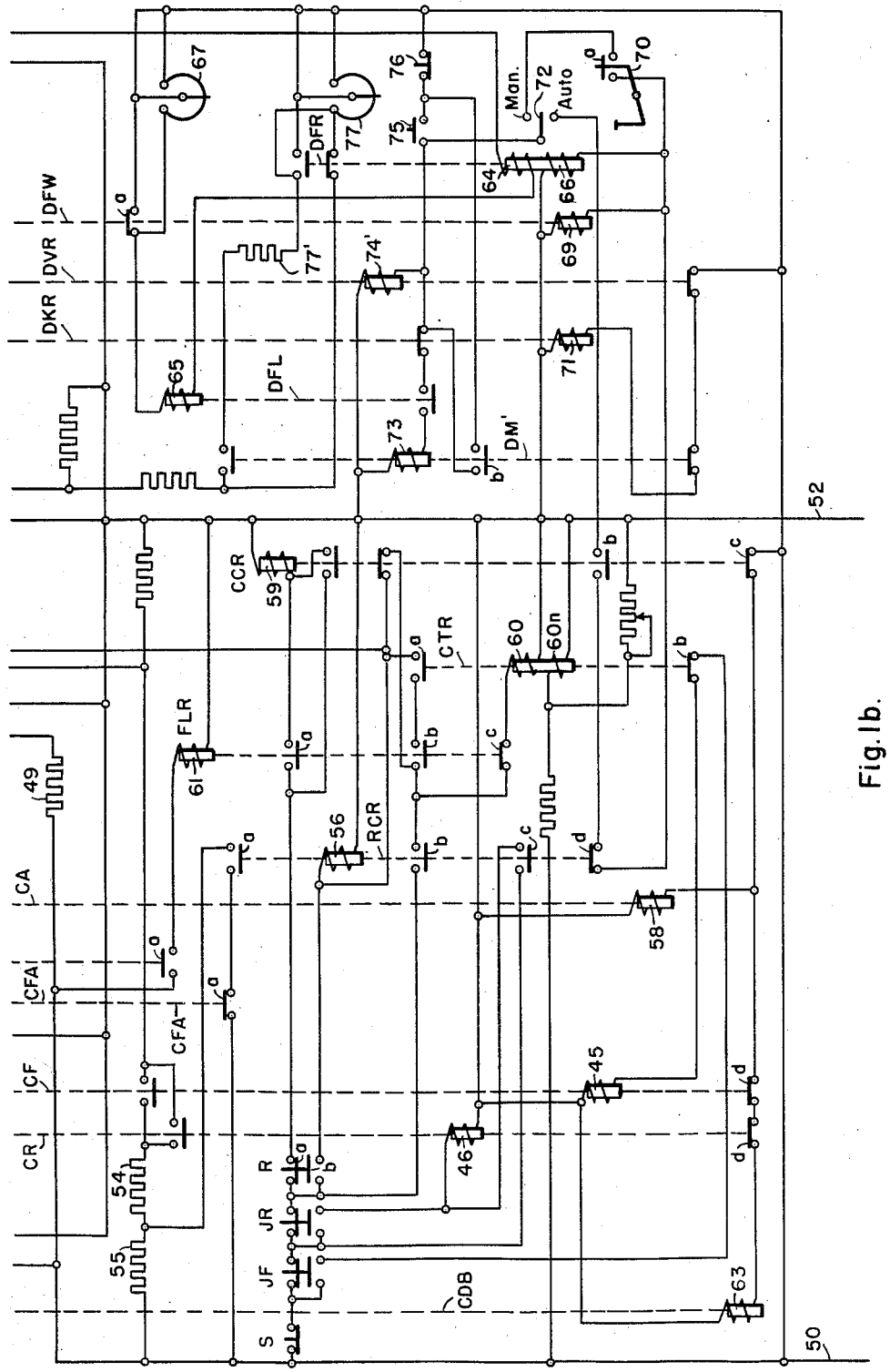

For a more complete understanding of the nature and scope of my invention, reference may be made to the following description in connection with the accompanying drawings, in which Figures 1a and 1b together form a schematic diagram of an adjustable voltage bench control system embodying the invention in one of its forms; and Fig. 2 is an enlarged partial plan view of the draw bench showing mechanical details thereof.

Referring generally to Figs. 1a and 1b, the numeral 10 may denote generally an adjustable voltage draw bench motor control system in which a draw motor DM having an armature 11, a shunt winding 12 and a series field winding 13, is operatively connected to a sprocket 15 for driving a chain 17 which supplies the power for a drawing operation. The armature 11 is supplied with electrical energy from a draw generator DG having an armature 19 driven by a motor M which is connected to a suitable source, a separately excited field winding 20, and a killer field winding 21 for reducing the residual voltage of the generator.

A carriage motor CM, having an armature 22 and a shunt field winding 23, is connected to a pulley 25 for operating a cable 26 connected to a carriage 27. Electric energy is supplied to the armature 22 by a carriage generator CG having an armature 29, a series field winding 30, a separately excited main winding 31 and a differential field winding 32.

Referring momentarily to Figs. 1a and 2, it will be seen that the carriage 27 is provided with a pair of tongs 35 for gripping the end of a pipe 37, or the like, which projects through a die block 38 used for drawing it to size. The tongs 35 are connected to the carriage 27 by means of a pivot 40 to a block 41 on which is pivotally mounted a hook 42 which is normally maintained in an inoperative position by a releasable latch 43 disposed to be released through operation of a push rod 44 when the push rod engages the die block 38. The purpose of the hook 42 is to engage the draw chain 17 so as to move the carriage 27 to the right and clamp the end of the pipe 37 in the tongs 35, so as to draw the pipe through the die block 38. Slow-down and final-limit switches 47 and 48, respectively, are provided for actuation by the carriage as it approaches the die block.

The carriage generator CG is reversibly connected to the carriage motor CM by means of forward and return relays CF and CR respectively. The forward relay CF has an operating winding 45 and is disposed to be operated under the control of a "forward jog" push button JF for moving the carriage away from the die block. The return control relay CR has an operating winding 46, and is likewise operable under the control of a "return jog" push button JR, and is also controlled by a carriage return relay RCR.

The main field winding 23 of the carriage motor CM may be energized from any suitable source of excitation, being connected to conductors 50 and 52, which may be energized in conjunction with the connection of the motor M to the source, if desired. The differential field winding 32 of the carriage generator may also be connected to these conductors through a current limiting resistor 49. The main field winding 31 of the carriage generator is also connected to the conductors 50 and 52 through resistors 54 and 55, resistor 55 being shunted by the contacts of a carriage field accelerating relay CFA having a shunt operating winding 51 and a series operating winding 51' and a carriage return relay RCR having an operating winding 56. A resistor 57 is connected in series with the armature 29 of the carriage generator CG for limiting the armature current of the carriage motor under stalled operating conditions. A carriage armature relay CA having an operating winding 58 is provided for shunting the resistor 57 under predetermined operating conditions. A carriage control relay CCR is provided for controlling operation of the armature relay CA. A carriage stall time contactor CTR having main and neutralizing windings 60 and 60n is provided to limit the duration of the stalled operating condition of the carriage motor in the event of failure of other devices to function. A final limit relay FLR having a winding 61 operates in response to operation of the final limit switch 48 for controlling the carriage control relay CCR. Dynamic braking is provided by a resistor 62 under the control of a dynamic braking relay CDB having a winding 63.

The field winding 12 of the draw motor DM is connected to the conductors 50 and 52 through series operating winding 64 of a draw fast relay DFR which controls the speed of the draw motor, and the operating winding 65 of a field loss relay DFL which operates when the field winding 12 of the draw motor is energized. The draw fast relay DFR is provided with a shunt winding 66 which bucks the field winding 64 to drop the relay out for fast operation, either in response to deenergization of relay RCR or in response to operation of a manual switch 70. A field weakening relay DFW is provided for inserting a rheostat 67 in circuit with the field winding 12 as the draw generator approaches a full voltage. This relay is provided with a shunt winding 68 connected across the armature of the draw generator DG and a cumulative separately excited winding 69 disposed to be connected to the conductors 50 and 52 in parallel with winding 66, either through a manually operated switch 70, or through back contacts d of the carriage return relay RCR and front contacts b of the carriage control relay CCR, depending on whether a control switch 72 is positioned for manual or automatic operation. A killer field relay DKR having a winding 71 connects the killer field winding 21 of the draw generator across the generator armature to kill any residual voltage in response to deenergization of a draw generator field contactor DM' having a winding 73 and a voltage relay DVR which has an operating winding 74' for picking it up, whereupon it is responsive to low voltage across the generator armature by reason of voltage winding 74 connected across the armature 19, which holds the relay energized to a predetermined value of low voltage after winding 74' is deenergized. Start and stop pushbutton switches 75 and 76 control contactor DM.

In operation the motor M is started and conductors 50 and 52 are energized in any suitable manner. Switch 72 is set for automatic operation, and start pushbutton 75 is operated to pick up contactor DM', the field relay DFL being energized with the field winding 12. Contactor DM' seals in through contact b of DM'. The return pushbutton R is pressed, interrupting the energizing circuit for carriage control relay CCR at contact a and completing an energizing circuit for the operating winding 56 of the carriage return relay RCR at contact b. An energizing circuit is therefore provided for the operating winding 58 of the carriage armature relay CA through contact c of relay CCR. This shunts the stall resistor 57 in the armature circuit of the carriage generator and motor, and the field weakening relay DFW drops out due to the interruption of the energizing circuit at contact b of relay CCR. Rheostat 67 is shunted by a contact a of relay DFW, applying full field to the motor shunt field 12, so that the draw motor reduces to hook-up speed. The draw fast relay DFR picks up as the motor field current builds up, shunts rheostat 77 and inserts resistor 77' in the draw generator field circuit to provide the generator voltage for hook on speed.

The carriage return relay RCR shunts the slowdown resistor 55 at contact a, and the return relay CR and the stall time contactor CTR pick up, the former by winding 46 being energized through contact c of relay RCR, and the latter by reason of winding 60 being energized through contact b of RCR, thus applying full field to the winding 31 of carriage generator CG, so that the carriage returns towards the die is at high speed.

As the carriage 27 passes the slow-limit switch 47, it actuates the switch to provide an energizing circuit for the shunt winding 51 of the carriage field accelerating relay CFA, causing this relay to pick up and contact a thus inserts the slow-down resistor 55 in circuit with shunt winding 31 of the carriage generator. This reduces the voltage applied to the motor CM, causing the carriage to slow down.

The carriage 27 next operates the final limit switch 48, providing an energizing circuit for the final limit relay FLR at contact a. The final limit relay picks up, and completes the energizing circuit for the winding 59 of carriage control relay CCR at contact a. The energizing circuit for the winding 58 of armature relay CA is interrupted at contact c of relay CCR, so that it drops out to insert the stall resistor 57, and limit the armature current of the carriage motor. The winding 60 of the carriage stall time contactor CTR is deenergized by the opening of contact member c of the final limit relay FLR, and starts to time-out, it being of a delayed opening type.

By this time the carriage 27 has approached the die block 38 sufficiently close to actuate the push rod 44 to release the hook 42, the carriage motor CM stalls, and the final limit switch 48 is released as the carriage 27 is drawn toward the right by engagement of the hook 42 with the draw chain 17. Release of the final limit switch 48 deenergizes the final relay FLR. This interrupts the energizing circuit for the carriage return relay RCR and relay CFA at contact b of relay FLR, and deenergization of this relay interrupts the energizing circuit for the carriage return relay CR at contact c of relay RCR. Relay CR drops out, deenergizing the carriage motor, and braking relay CDB is energized through contact d of relay CR. The draw fast relay DFR has its separately excited winding 66 energized through contact d of relay RCR and contact b of relay CCR, so this winding bucks the shunt winding 64. Relay DFR drops out shunting resistor 77' and inserting rheostat 77, and draw motor DM operates at draw speed set by rheostat 77. At the end of the predetermined timing interval, relay CTR drops out to deenergize relay RCR, should the final limit 48 fail to function and leave the carriage motor stalled at the die block. Relay CTR in dropping out, sets up a circuit for the forward relay CF at contact b.

The slow-down-limit switch 47 resets as the carriage passes it, and the carriage is now set for high speed return, it being carried by the draw chain 17 in the draw direction until the pipe 37 is drawn clear of the die. When this happens, loss of load on the carriage causes the hook 42 to be kicked upwardly by the preceding link of the chain 17, thus disengaging the carriage from the chain 17 which continues to run in readiness for the next drawing operation.

When the slow-down-limit switch 47 is open, and the return push button R is operated, the shunt winding 51 of the carriage field accelerating relay CFA is not energized, and the slow resistor 55 will be short-circuited. The carriage generator CG builds up voltage and the armature current causes the relay CFA to pick up when the current has built up to approximately 150% of the full load value. When relay CFA picks up it inserts the resistor 55 in series with the main field winding 31 of the carriage generator CG causing the voltage of the generator to drop and hence reducing the armature current. At approximately 120% of the full load value, relay CFA drops out shorting the resistor 55 and causing the voltage of the generator CG to build up and the armature current to increase. The relay CFA flutters, rapidly opening and closing the shunt circuit around the resistor 55, so as to hold the accelerating current of the carriage motor between 120% and 150% of its full load value until the motor accelerates to full speed and the armature current drops below the full load value.

When the carriage motor is running at rated speed, and the slow limit switch 47 is actuated, the shunt winding 51 of relay CFA will be energized. This causes the relay to pick up since the shunt winding has approximately 1458 ampere turns and the pick up setting of the relay is approximately 810 ampere turns. The resistor 55 is therefore inserted in series with the main field winding 31 of the carriage generator CG causing its voltage to drop. The counter electromotive force of the carriage motor CM will now be higher than the generator voltage, thus causing the motor armature current to reverse in slowing the motor down by regenerative braking. When the reverse current reaches approximately 150% of the full load value, it produces approximately 810 ampere turns in the current winding which bucks the shunt winding, thus reducing the total ampere turns to approximately 648, and causing the relay to drop out again shorting the resistor 55. The armature current decreases and at approximately 120% of full load current it will have reduced sufficiently to permit the relay to again pick up and reinsert the resistor 55. The relay CFA continues to thus flutter until the motor reaches the slow speed, when the armature current drops to or below the full load value.

Should the slow-down-limit switch be closed when the return push button is operated, as would be the case when the carriage, for one reason or another, is already in contact with the slow-down-limit switch, the return carriage relay RCR will operate, energizing both the armature field accelerating relay CFA and the return contactor CR. The carriage armature relay CA is thereupon energized and the dynamic braking contactor CDB is deenergized. The shunt field winding 31 of the carriage generator is energized with the slow resistor 55 in series for operating the carriage motor at slow speed. The armature current of motor CM in series winding 51' adds to the ampere turns of the shunt winding 51, so that the relay CFA remains operated and the carriage motor merely accelerates to, and runs at its slowest speed.

The carriage motor CM may be jogged either forward or reverse at slow speed by means of the jog buttons. Pressing the "Jog Fwd." button JF picks up relay CF and CF interlock d drops out CDB. Since RCR is deenergized, resistor 55 is connected in circuit with the carriage generator field winding, the carriage motor operates at slow speed in the forward direction as long as the "Jog-Fwd." JF button is held down. Pressing the "Jog Return" JR button picks up relay CR, and CR interlock d drops out CDB. The carriage motor operates in the return direction at slow speed, since RCR is deenergized.

With the "Man.-Auto" selector 72 in the "manual" position, the draw motor DM may be operated by means of the "Slow"-"Fast" buttons 70 at either the slow or hook-on speed and the fast or draw speed. Relays DFR and DFW are deenergized when the "Draw Slow" button is depressed to open contact a. The DFW relay applies full field to the draw motor. The DFR relay picks up shorting the rheostat 77, and inserting the hook-on resistor 77' in series with the draw generator shunt field 20, so that the draw motor runs at slow speed. If the "Draw Fast" button is pressed, to close contact a, the DFR coil 66 and DFW coil 69 are energized. DRF coil 66 bucks DFR coil 64 to drop out the DFR relay shorting resistor 77' and inserting rheostat 77 in series with the draw generator shunt field 20. As the generator voltage builds up DFW coils 68 and 69 pick up the DFW relay, inserting rheostat 67 in series with the draw motor shunt field 12. The draw motor DM runs at the fast or draw speed.

It will be noted that the draw or fast speed is selected by means of the rheostats 67 and 77. The slow or hook-on speed is fixed by the value of resistance in resistor 77'. Also, in either manual or automatic operation the draw motor is started by pressing the "Draw Start" button 75 and continues to run until the "Draw Stop" button 76 is operated.

From the above description and the accompanying drawings, it will be apparent that I have provided in a simple and effective manner for controlling the operation of the carriage motor in an adjustable voltage draw bench motor control system.

By utilizing a field accelerating relay in the manner described, control of the carriage motor speed may be effected under predetermined operating conditions and regulation of both the motoring and regenerating current may be successfully effected under other operating conditions.

Since certain changes may be made in the above described construction and different embodiments of the invention may be made without departing from the spirit and scope of the invention, it is intended that all the matter contained in the above description and shown in the accompanying drawings shall be considered illustrative and not in a limiting sense.

I claim as my invention:

1. A control for a motor connected in driving relation with a carriage of a draw bench comprising, a generator for supplying electrical energy to the motor, first control means including a resistor and a control relay therefor for varying the excitation of the generator, said control relay having a plurality of windings, circuit means connecting one of said windings to be energized in accordance with the motor current, and additional circuit means responsive to the position of said carriage for energizing another of the windings in accordance with a predetermined position of the carriage.

2. In a control system for a motor driving the carriage of a draw bench, a generator for supplying electrical energy to the carriage motor, relay means responsive to the armature current of the motor for varying the excitation of the generator to maintain a predetermined value of motor armature current, and control means including a switch member operable in response to a predetermined position of the carriage and operative to change the excitation of the generator to reduce the speed of the motor when said carriage is in said predetermined position.

3. In a control system for a motor driving the carriage of a draw bench, a generator for supplying electrical energy to the carriage motor, switch means responsive to the position of the carriage, and control means for varying the voltage of the generator, with said control means including a relay selectively responsive to the armature current of the motor and said switch means, with said control means being operative for regulating the armature current and controlling the speed of the motor.

4. In combination, a motor having an armature connected in driving relation with the carriage of a draw bench, a generator having an armature connected in circuit with the motor armature and having a field winding, circuit means connecting said field winding to a source of electrical energy including a resistor, a relay having contacts for shunting said resistor and having a plurality of windings, circuit means connecting one of said windings for energization in accordance with the current of the motor armature, and means including a limit switch actuated by the carriage for connecting another of said plurality of windings to a source of control voltage.

5. In a variable voltage control system for a draw bench carriage motor, a generator having an excitation circuit, said generator being connected to energize said motor, impedance means, circuit means including a relay having a plurality of windings for effecting connection of the impedance means in said excitation circuit, circuit means connecting one of said windings for energization in accordance with the armature current of the motor, means including a limit switch actuated by the motor for energizing another of said windings, means including a carriage return relay for shunting the impedance means and effecting increased return speed of the carriage motor, circuit means including a stall relay for limiting the armature current and an additional limit switch for controlling operation of the return relay and the stall relay.

6. In a control system for a motor having an armature connected to drive a carriage in a draw bench and having a field winding energized from a source of control voltage, a generator having an armature connected in circuit with the motor armature and having a field winding, circuit means including a resistor connecting the field winding to a source of excitation, means including a relay for providing a shunt circuit about said resistor, a switch operable in response to motion of the carriage to effect operation of said relay means to interrupt said circuit, said relay means having a winding energized in accordance with the armature current of the motor for operating as a regulating relay to maintain a predetermined value of armature current, and a limit switch responsive to further motion of the carriage to connect a resistor in the armature circuit of the motor to limit the stall current.

7. A drive for a draw bench comprising, a draw motor having a field winding and an armature connected in driving relation with a chain for drawing a carriage to draw an elongated member through a die, a draw generator having an armature connected in circuit with the draw motor armature and having a field winding, resistance means connecting the motor field winding to a source of excitation, a draw motor field weakening relay normally shunting said resistance means, control means operable to render said relay ineffective, means including a resistor connecting the draw generator field winding to a source of excitation, a draw fast relay having a contact for shunting the resistor, a carriage motor having a field winding connected to a source of excitation and an armature connected in driving relation with the carriage, a carriage generator having a field winding and an armature connected in circuit with the carriage motor armature, impedance means connecting the carriage generator field winding to a source of excitation, a carriage generator field relay for connecting the impedance means in circuit with the carriage generator field winding, said relay having one winding energized in accordance with the armature current of the carriage motor and having an additional winding, a limit switch responsive to movement of the carriage past a predetermined position to effect energization of said additional winding to cause said relay to slow the carriage motor down, and means including a final limit switch responsive to further movement of the carriage to effect disconnection of the carriage motor armature from the carriage generator armature and causing the draw fast relay to shunt the resistor in circuit with the draw generator field winding.

8. In a control system for a motor connected in driving relation with the carriage of a draw bench, a generator for supplying electrical energy to the motor, and switching means for selectively varying the generator excitation, said switching means being responsive to the current of said motor for varying said generator excitation, and with said switching means including a control member responsive to the position of said carriage for varying the excitation of said generator when said carriage moves to a predetermined position.

9. In a control system for a motor having an armature connected in driving relation with the carriage of a draw bench, the combination of a generator having an armature connected in a closed circuit with said motor armature and having a field winding, impedance means operative with said motor to control the operation of said motor, a first switch member operative with said impedance means for controlling the connection of said impedance means for controlling said motor, a first circuit means for operating said first switch member in accordance with a predetermined value of motor armature current, and second circuit means including a second switch member actuated by said carriage for operating said first switch member in response to a predetermined position of said carriage.

References Cited in the file of this patent

UNITED STATES PATENTS

| | | |
|---|---|---|
| 1,820,786 | Eaton | Aug. 25, 1931 |
| 1,930,513 | Eames | Oct. 17, 1933 |
| 2,410,594 | Andrews | Nov. 5, 1946 |
| 2,575,717 | King | Nov. 20, 1951 |